United States Patent

Belson et al.

[15] 3,699,553

[45] Oct. 17, 1972

[54] NONDESTRUCTIVE READOUT THIN FILM MEMORY DEVICE AND METHOD THEREFOR

[72] Inventors: Henry S. Belson, Adelphi; Bernard F. DeSavage, Laurel, both of Md.; Robert S. Tebble, Wilmslow, England

[73] Assignee: The United States of America as represented by the Secretary of the Navy

[22] Filed: Feb. 12, 1971

[21] Appl. No.: 114,920

[52] U.S. Cl. ....................340/174 TF
[51] Int. Cl. ....................G11c 11/14
[58] Field of Search ....................340/174 TF

[56] References Cited

UNITED STATES PATENTS

| | | | |
|---|---|---|---|
| 3,286,241 | 11/1966 | Hasty et al. | 340/174 TF |
| 3,119,753 | 1/1964 | Mathias et al. | 340/174 TF |
| 3,124,490 | 3/1964 | Schmecken | 340/174 TF |
| 3,258,752 | 6/1966 | Bradley | 340/174 TF |
| 3,111,652 | 11/1963 | Ford, Jr. | 340/174 TF |
| 3,487,379 | 12/1969 | Bartik | 340/174 TF |
| 3,387,289 | 6/1968 | Walter | 340/174 TF |
| 3,427,600 | 2/1969 | Middelhock | 340/174 TF |

*Primary Examiner*—Stanley M. Urynowicz, Jr.
*Attorney*—R. S. Sciascia

[57] ABSTRACT

A thin film material having a rectangular hysteresis characteristic along both easy and hard axes has a small d.c. biasing field applied at a small angle to the easy axis, producing a triangular hysteresis curve when observed along an axis perpendicular to the axis of the d.c. biasing field. The two resulting stable states are of greatly different permeability, thus enabling either a.c. or pulsed d.c. nondestructive readout. Switching is achieved by applying a saturating d.c. field along the axis perpendicular to the d.c. biasing field axis in either the positive or negative direction, and the readout field is also applied along the axis perpendicular to the d.c. biasing field axis.

10 Claims, 7 Drawing Figures

INVENTORS
Henry S. Belson
Bernard F. De Savage
Robert S. Tebble
BY J. O. Tresansky
ATTORNEY

NONDESTRUCTIVE READOUT THIN FILM MEMORY DEVICE AND METHOD THEREFOR

BACKGROUND OF THE INVENTION

This invention relates generally to the art of magnetic memory readout, and more particularly to a nondestructive readout thin film magnetic memory element and method.

Prior art thin magnetic film memory elements generally have a square hysteresis loop with two resulting zero magnetic field remanent states of equal magnitude and opposite polarity representing the digits 1 and 0. These memory elements are read by applying a d.c. magnetic filed of sufficient magnitude and appropriate polarity to reverse the remanent state. The resulting magnetization flip induces a voltage in a sense winding, and with knowledge of the polarity of the switching pulse may be interpreted as a "1" or a "0." These prior art thin film memory elements are lacking in efficiency, however, since the act of reading out a digit reverses the magnetization, and to retain the digit in memory, an additional reset pulse must be applied. Thus, the operational speed of the memory is reduced by the additional time required to reset the memory to its state prior to readout. Additionally, previously available memories are only capable of pulsed d.c. readout, which, in some applications may be undesirable. For example, the output signal in these memories is also a pulse, and, in some situations, it may be desirable to have a continuous output signal that can be produced only by an a.c. readout signal.

The thin magnetic films presently used in computer memories have a uniaxial anistropy axis, wherein the opposing easy directions define the "0" or "1" states of the memory element. In certain films, however, there are apparent energy minima normal to this easy axis resulting in a square hysteresis loop in the hard direction. This type of film, which has been known for some years, has been previously overlooked in the search for improved thin film memories.

SUMMARY OF THE INVENTION

Accordingly, one object of this invention is to provide a new and improved magnetic thin film memory element.

Another object of the instant invention is the provision of a new and improved nondestructive readout memory element.

Still another object of the present invention is the provision of a nondestructive readout thin film memory device capable of being read by either a.c. or pulsed d.c. readout signals.

A further object of the instant invention is the provision of a method for effecting nondestructive readout in a thin film memory device.

Briefly, in accordance with one embodiment of this invention, these and other objects are attained by a magnetic thin film memory element having square hysteresis loops in both easy and hard directions with a small d.c. biasing field applied at a slight angle to the easy axis. Along an axis perpendicular to the axis of the d.c. biasing field, the thin film element exhibits a triangular hysteresis curve having two stable remanent states of different permeability and nondestructive readout is effected by either an a.c. or a pulsed d.c. field applied perpendicular to the axis of the biasing field.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
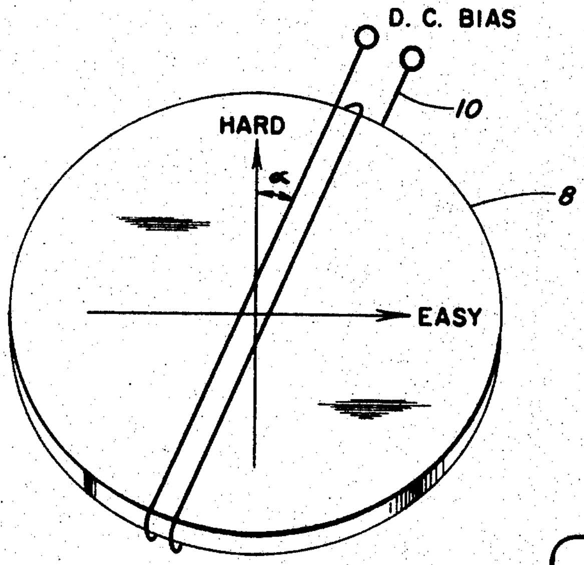
FIG. 1 is a pictorial view of a ferromagnetic thin film element.
Figures 2, 3:
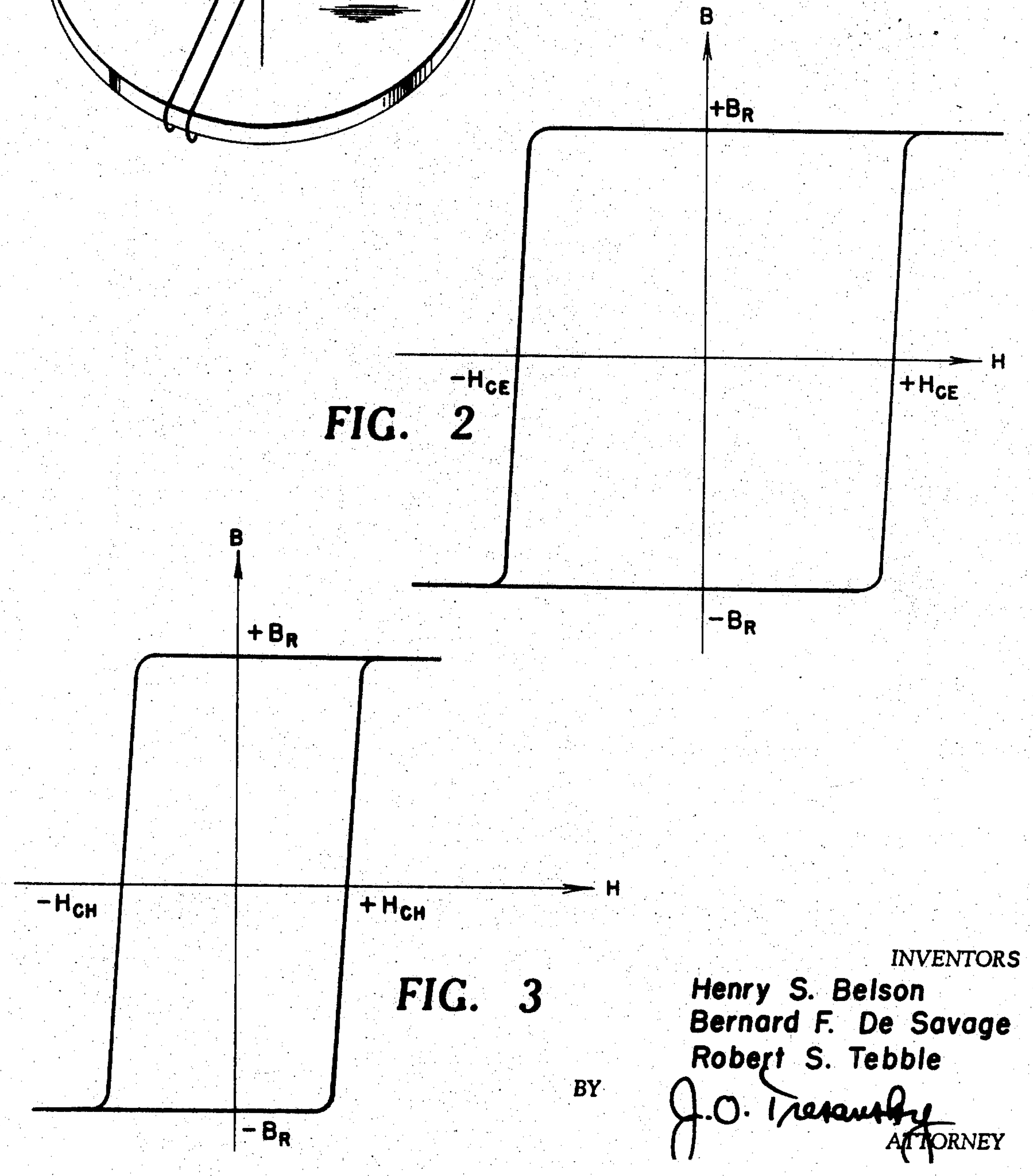
FIG. 2 is a diagrammatic view of the hysteresis loop of the thin film element of FIG. 1 along the easy axis.
FIG. 3 is a diagrammatic view of a hysteresis loop of the thin film element of FIG. 1 along the hard axis.

Referring now to the drawings wherein like reference characters designate identical or corresponding parts throughout the several views and more particularly to FIG. 1 thereof wherein a thin ferromagnetic film element 8 having an easy axis and a hard axis, depicted by arrowheads, is shown with a d.c. bias winding 10 wound at a small angle $\alpha$ to the hard axis. FIG. 2 illustrates the hysteresis loop along the easy axis of the thin ferromagnetic film 8, wherein the easy axis coercivity, i.e., the amount of magnetizing force needed to reduce the induction B to zero is $H_{CE}$. The remanent magnetic fields are $+B_R$ and $-B_R$, representing the two stable states of thin film element 8 along the easy axis. This type of hysteresis curve occurs in conventional uniaxial anisotropic thin films only along the easy axis. In certain films, however, there may be apparent energy minima normal to the easy axis, and if one makes measurements of the hysteresis characteristics along the hard axis a square loop is also obtained, as illustrated in FIG. 3. In these films, it is believed that the apparent hard direction energy minima are the result of a domain structure rather than a biaxial anisotropy, and the degree of "squareness" in the hard direction depends primarily on the dispersion of the local uniaxial easy directions. In one example, a thin film exhibiting square hysteresis loops in both easy and hard directions was composed of 82.7% Ni and 17.3% Fe (by weight) and as a coercive force in the hard direction, $H_{CH}$, approximately half of the coercivity in the easy direction, $H_{CE}$.

Figure 4:
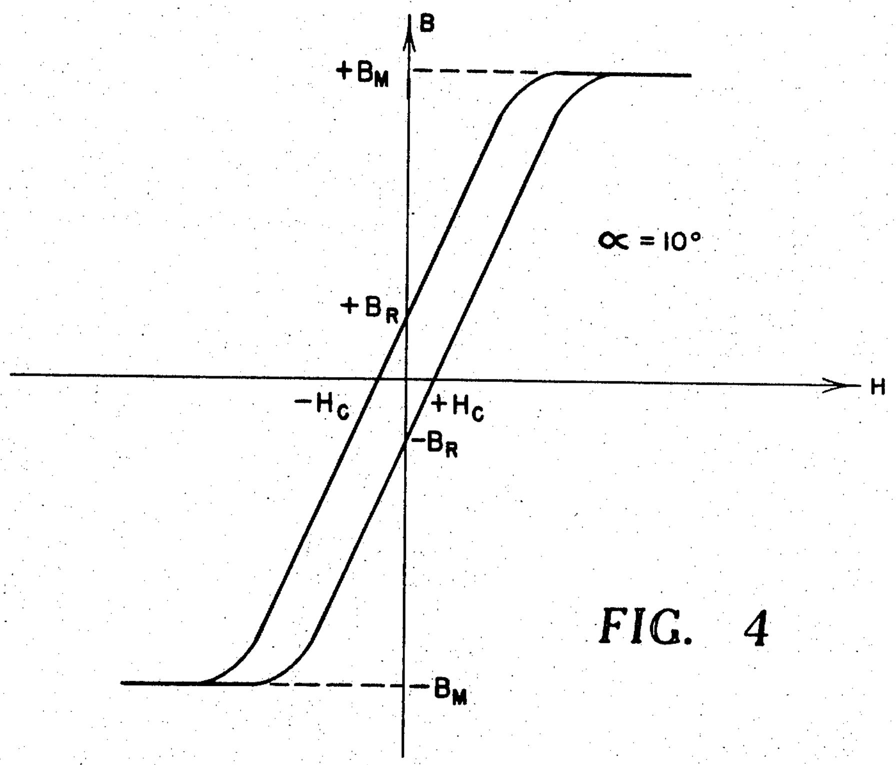
FIG. 4 is a diagrammatic view of the hysteresis loop of the thin film element of FIG. 1 along an axis at a slight angle to the hard axis of the material.
Figure 5:
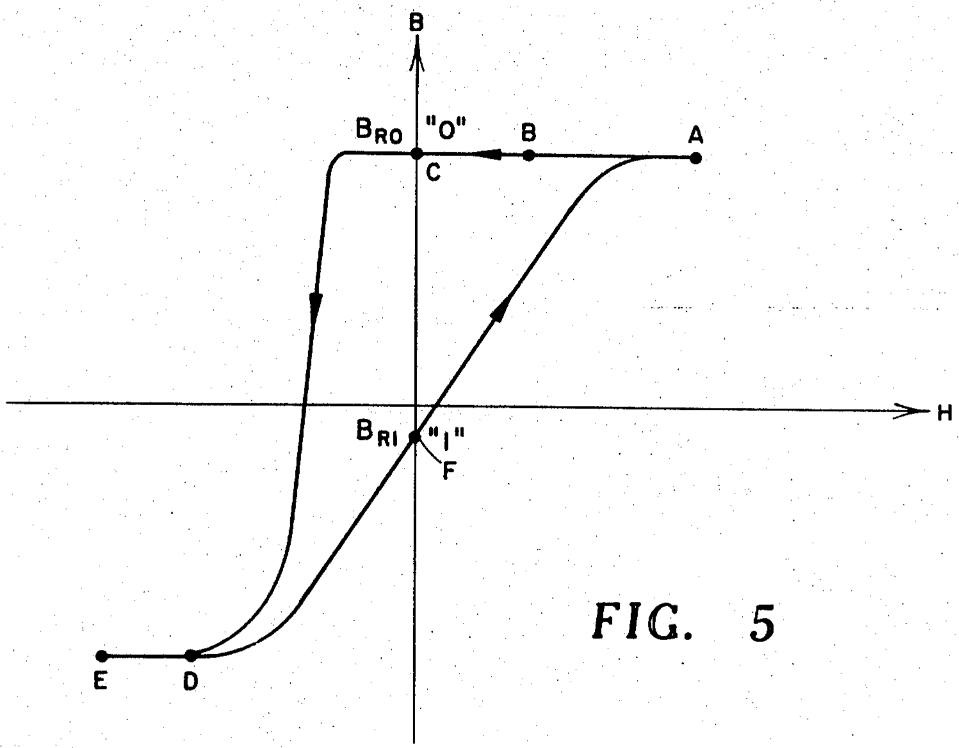
FIG. 5 is a diagrammatic view of a triangular hysteresis curve of the thin film element of FIG. 1 after a d.c. biasing field has been applied.

If a saturating a.c. drive field is applied to thin film 8 at a small angle $\alpha$ to the hard direction, typical Stoner-Wohlforth behavior for uniaxial films results, as shown in FIG. 4, where it should be understood that the hysteresis loop of FIG. 4 is recorded along the direction that the a.c. drive field is applied. If a small d.c. bias field, $H_O$, of magnitude $H_K \sin\alpha$ is now generated normal to the saturating a.c. drive field, i.e., at an angle $\alpha$ to the easy axis by applying a d.c. current to bias winding 10, a triangular hysteresis curve is obtained, as shown in FIG. 5. In one example $\alpha$ was chosen to be about 10°, but it should be understood that $\alpha$ can be any angle less than 45°. It should also be understood that $H_K$ is the anisotropy field, i.e., the magnitude of field strength required to rotate the magnetization from the easy to the hard axis. In one instance the magnetic thin film used had an $H_K$ of about 6 oersteds. The directions of the applied fields are shown vectorially in FIG. 6, wherein the a.c. drive field is represented by a vector 12 at an angle $\alpha$ to the hard axis whose magnitude varies sinusoidally, and the d.c. bias field is represented by a vector 14 at the same angle $\alpha$ to the easy axis.

Figure 6:
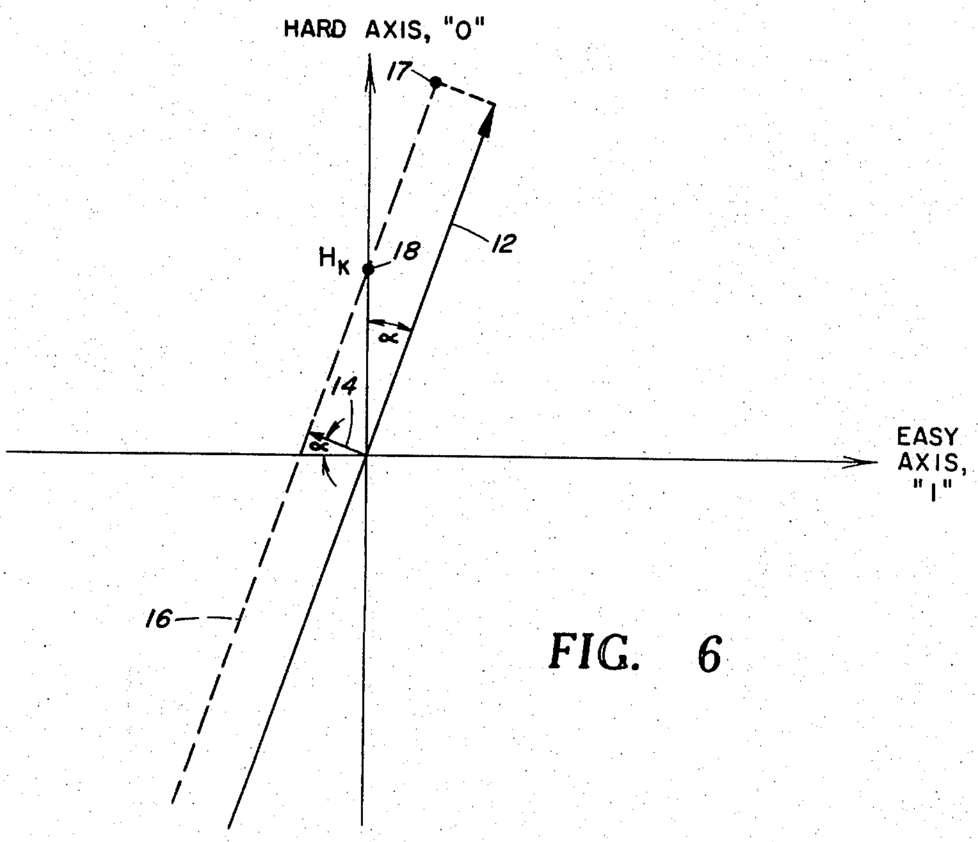
FIG. 6 is a vector representation of the various external fields applied to the thin film material of FIG. 1.

The hysteresis curve of FIG. 5 may be better understood with reference to FIG. 6. As shown in FIG. 6, the bias field and the alternating field add vectorially to give a total field vector whose head follows a dashed line 16 as the a.c. drive field varies. If the a.c. drive field is assumed to be of large positive magnitude initially where the positive direction is in the first quadrant of FIG. 6, the initial total field will be at a point 17 on dashed line 16. As the magnitude of the a.c. drive field is diminished, the total field proceeds along dashed line 16 until it reaches a point 18 having a magnitude $H_K$ and aligned along the positive hard axis, referred to arbitrarily as the "0" direction. The dashed line 16 will intersect the hard axis at a magnitude $H_K$ because the d.c. bias field has been chosen to be of magnitude $H_K \sin \alpha$. The portion of dashed line 16 traversed corresponds to a traversal from point A to point B in FIG. 5. Reducing the value of the a.c. drive field to zero magnitude leaves the magnetization aligned along the hard direction with a remanent value of $B_{RO}$, indicated as point C in FIG. 5, and arbitrarily referred to as the "0" remanent state. As the a.c. drive field becomes negative, it has little effect on the magnetization until it exceeds $H_{CH}$, the coercivity in the hard direction, at which time magnetization reversal occurs, and the magnetization is aligned essentially in the negative direction. This is shown in FIG. 5 as the traversal from point C to point D. Increasing the magnitude of the a.c. drive filed in the negative direction merely tends to align the magnetization more firmly into this direction, without substantially altering its magnitude, as shown in FIG. 5 as the traversal from point D to point E. When the negative a.c. drive field returns to zero, the magnetization follows the direction of the total field along line 16 of FIG. 6, and seeks out the easy direction, due to the forces exerted by the anisotropy. The component of remanent magnetization $B_{R1}$ along the direction that the a.c. drive field is applied, which is the direction that the hysteresis loop of FIG. 4 is measured, is very small compared to the remanent magnetization $B_{RO}$. As shown in FIG. 5, the reduction in a.c. drive field from large negative value to zero results in the traversal along the hysteresis loop from point E to point F, referred to arbitrarily as the "1" state. Increasing the a.c. drive field to a large positive value rotates the magnetization nearly into the positive hard direction, corresponding to the traversal from point F to point A in FIG. 5 thereby completing the loop. Thus, by applying a small d.c. bias field at a slight angle $\alpha$ to the easy axis of magnetic film 8 having square loop hysteresis characteristics in both easy and hard directions, a device having two stable states is provided with one state aligned along the hard axis and the other state aligned along the easy axis. It should be noted that increasing the angle $\alpha$ necessitates applying a larger d.c. bias field.

FIG. 5, illustrates that the two stable states "0," and "1" have considerably different magnetic properties. First, the remanent magnetic induction $B_{RO}$ associated with the "0" state has considerably greater absolute magnitude then the remanent induction $B_{R1}$ associated with the "1" state. This is in contrast to the typical memory device having a square hysteresis loop, wherein the absolute magnitude of the remanent inductions in both states are equal. Second, it will be observed that the permeability, defined as the slope of the B-H curve, differs for the two stable points illustrated in FIG. 5. In the "0" state the permeability is essentially zero, while in the "1" state the permeability is some positive value. Thus, the device of the present invention is characterized by a high permeability "1" state, and a low permeability "0" state. These properties can be used advantageously to produce a nondestructive readout memory device.

Figure 7:
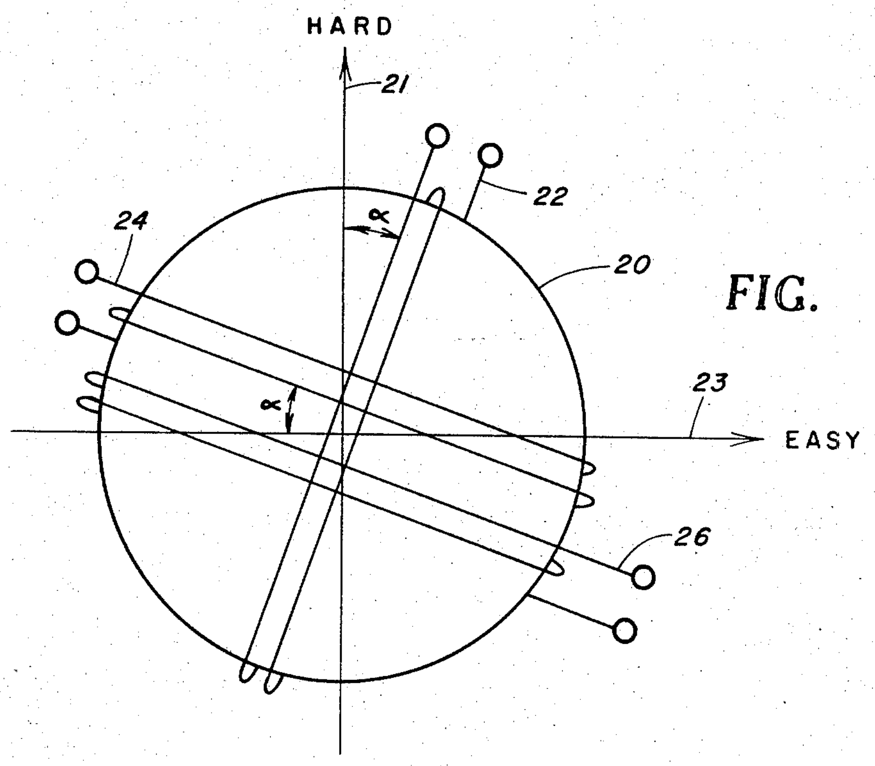
FIG. 7 is a pictorial view of a nondestructive thin film memory element according to the present invention.

A nondestructive readout thin film memory device capable of either a.c. or d.c. readout is illustrated in FIG. 7. A thin film 20 of the type described hereinbefore has its hard and easy axes in the directions indicated by the arrow heads 21 and 23, respectively. A bias winding 22 is wound at an angle $\alpha$ to the hardaxis, so that when energized with a d.c. current, a bias field is established at an angle $\alpha$ to the easy axis. A read-write winding 24 is wound on the thin film perpendicular to the bias winding 22 also at the angle $\alpha$ to the easy axis, so that when energized with either an a.c. or d.c. readout current, a readout field is developed at the angle $\alpha$ to the hard axis. A sense winding 26 is wound parallel to the read-write winding 24.

In operation, a d.c. current is applied to bias winding 22, producing a memory element having the two stable states shown in FIG. 5. A d.c. read pulse or an a.c. read signal on read-write winding 24 when the memory element is in the "0" state induces essentially no change in flux in sense winding 26, and, therefore, sense winding 26 sees no signal, i.e., a "0." Either a d.c. or an a.c. read signal on read-write winding 24 applied to the memory element while in the "1" state carries the magnetization from point F along the hypotenuse of the triangular hysteresis curve in FIG. 5, and a distinct change of flux occurs thereby inducing a voltage in sense winding 26, a "1." In the latter case, since the read fields are essentially perpendicular to the magnetization, which is along the easy axis, a very fast response time results. To effect nondestructive operation, the read pulses must be of a magnitude less than $H_{CH}$, in which case the read signals may be repeatedly applied with no destruction of the information stored on the film.

In the hard direction "0" state, the magnetization may be induced to creep out of the hard direction by repeated negative read pulses, thus destroying the information. This will occur, however, only if the read pulses are of high amplitude. It has been found that if the amplitude of the magnetizing force produced by the negative read pulses is restricted to less than $H_{CH/2}$ the memory device remains stable against creep.

The tendency to creep does cause a small problem with regard to conventional coincident current writing in the negative direction. While writing a "1," it is necessary to apply a small positive bias to the whole array thereby essentially shifting the "0" state from point C toward point A and shifting the "1" state from point F toward point A in FIG. 5. Using this technique, coincident current values can be used such that when the write fields are added individually to the bias field a magnetic force is produced which is less than $H_{CH/2}$, but when added together produce a magnetic force greater than $H_{CH}$. Thus, individual write pulses will not cause creep. Write pulses in the positive direction are free of the aforedescribed difficulties, and coincident currents may be used to write zeros freely.

An alternative technique for avoiding the problem of creep is to set the whole memory to the "1" state initially. Then, positive pulses may be applied to a coincident current scheme to write in zeros where desired. The resulting stored information may be nondestructively readout indefinitely, but, of course, the memory must be reset to all ones prior to writing in new information. Such a scheme is obviously less flexible than the first, which allows one to write ones or zeros anywhere in the memory without having to first reset the memory.

It should be apparent that the memory device of the instant invention is capable of nondestructively being readout by either an a.c. or a d.c. current since the two stable memory states are distinguished by their permeability rather than the polarity of the pulse induced in the sense winding, as in prior art devices. It should also be apparent that the d.c. bias field may be applied by an external magnet, rather than a bias winding carrying a d.c. current.

Obviously, numerous modifications and variations of the present invention are possible in the light of the above teachings. For example, the read and write signals may be applied over separate windings. Additionally, conductors plated on the surface of the thin film elements may be used in place of the various aforedescribed windings. It is therefore to be understood that within the scope of the appended claims the invention may be practiced otherwise than as specifically described herein.

What is claimed as new and desired to be secured by Letters Patent of the United States is:

1. A magnetic device comprising:

a magnetic thin film having an easy axis and a hard axis, each axis having a square hysteresis characteristic; and means for producing in said thin film a triangular hysteresis characteristic when observed along a first axis at a slight angle to said hard axis.

2. The magnetic device of claim 1, wherein said means for producing a triangular hysteresis curve comprises means for biasing said thin film with a magnetic field applied at an angle normal to said first axis.

3. The magnetic device of claim 2, wherein said biasing means comprises a biasing conductor on said thin film along said first axis for carrying a biasing current.

4. The magnetic device of claim 3, wherein said slight angle is less than 45°.

5. A nondestructive readout memory device comprising:

a magnetic thin film having an easy axis and a hard axis, each axis having a square hysteresis characteristic;

means for producing in said film two stable states of substantially different permeability; and means for reading the state of said thin film comprising a read conductor for applying a read current to said memory and a sense conductor for receiving any voltage induced by said thin film in response to said read current.

6. The nondestructive readout memory device of claim 5, wherein said means for producing two stable state of substantially different permeability comprises means for biasing said thin film with a d.c. magnetic field applied at a slight angle to said easy axis.

7. The nondestructive readout memory device of claim 6, wherein said read conductor is on said thin film at said slight angle to said easy axis, and said biasing means comprises a biasing conductor on said thin film normal to said read conductor.

8. The nondestructive readout memory device of claim 7, wherein said read current is alternating current.

9. The nondestructive readout memory device of claim 7, wherein said read current produces a magnetizing force that is less than one-half of the hard axis coercivity of said thin film.

10. A method for nondestructively reading a thin film memory element having square hysteresis characteristics in both easy and hard directions, comprising the steps of:

applying a d.c. magnetic field at a small angle to the easy axis of said thin film memory element;

applying a read magnetic field normal to said d.c. magnetic field; and sensing the magnetic field induced by said thin film memory element normal to said d.c. magnetic field in response to said read magnetic field.

* * * * *